March 7, 1933.　　　S. C. PORTER　　　1,900,025
MEANS FOR PREVENTING REVERSE MOVEMENT
Filed Jan. 7, 1929　　　2 Sheets-Sheet 1
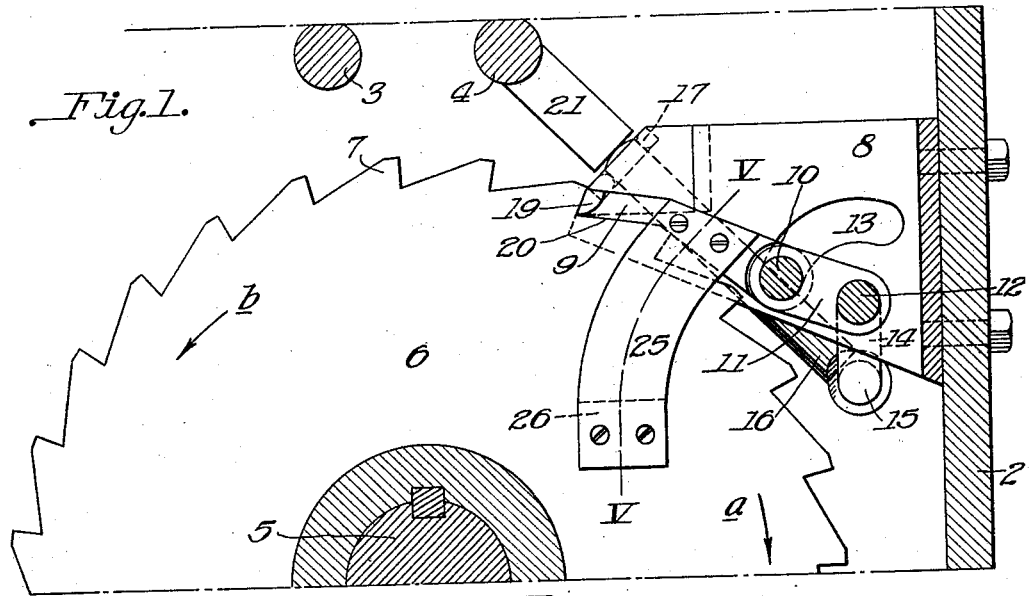
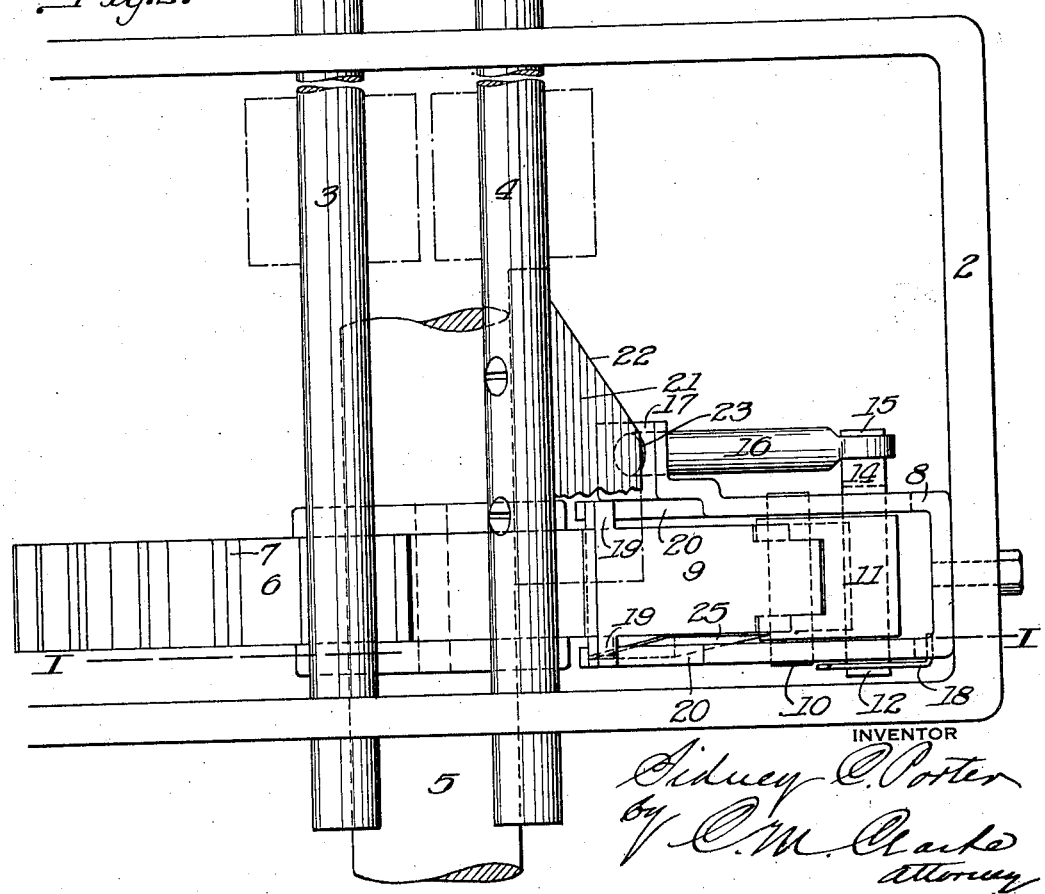
INVENTOR

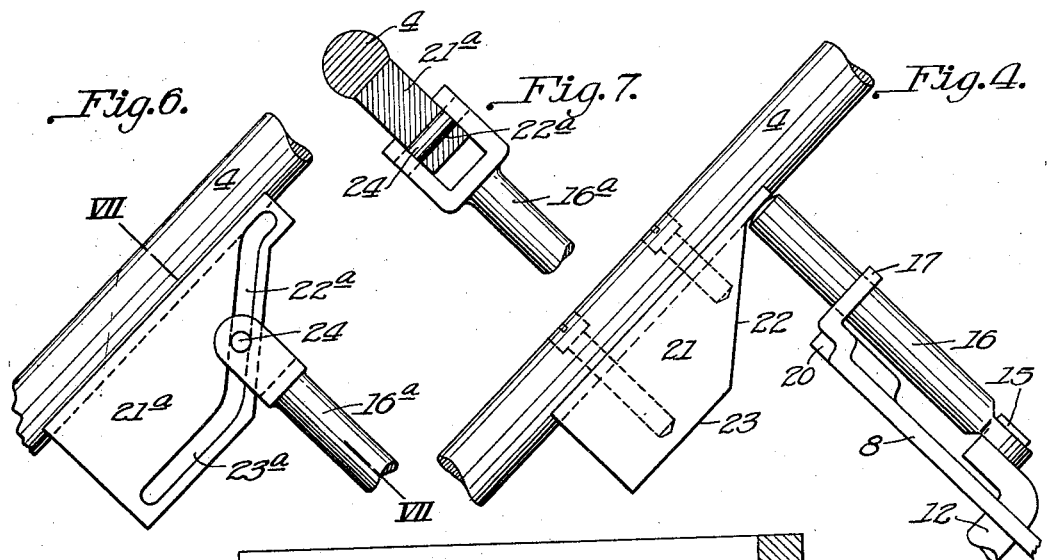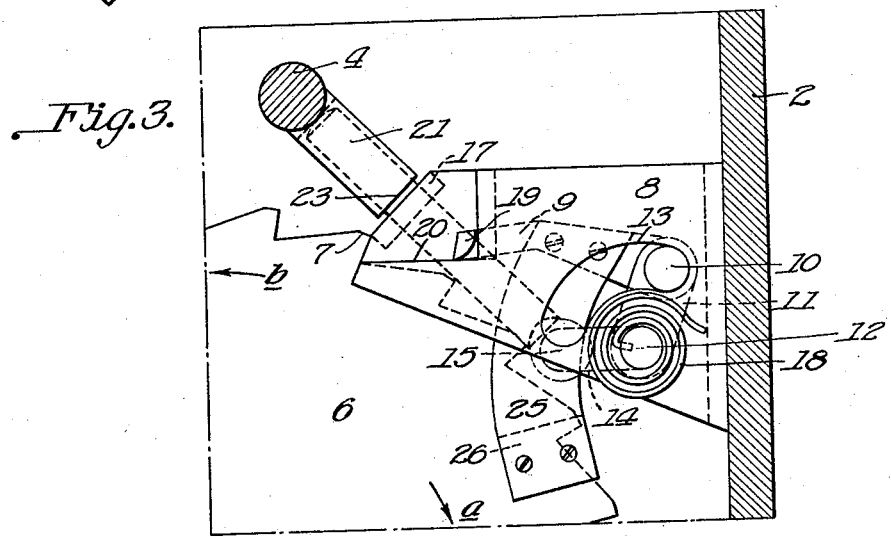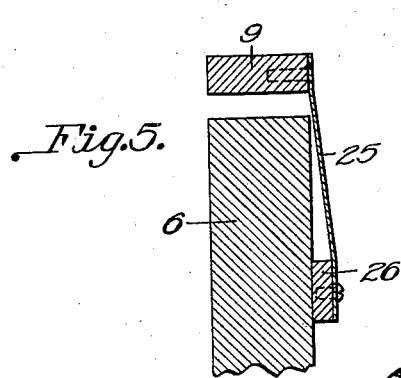

Patented Mar. 7, 1933

1,900,025

UNITED STATES PATENT OFFICE

SIDNEY C. PORTER, OF EAST LIVERPOOL, OHIO

MEANS FOR PREVENTING REVERSE MOVEMENT

Application filed January 7, 1929. Serial No. 330,696.

My invention consists of an improvement in means for preventing reverse movement of the drive shaft or axle of an automobile, or of undesired reverse movement of the operative mechanism of any apparatus to which the invention may be applied, as an elevator, etc.

In connection with the operation of motor-driven vehicles, it is desirable to provide an efficient and automatically operative means for preventing down grade backing in starting up grade from a standing position, as in traffic or at signal stops or when parked, against gravity backing tendency.

Ordinarily in starting under such conditions, the brakes, either foot brakes or emergency, must be maintained applied until one of the forward gear shifts, as low, is effected, with simultaneous release of the brakes. Such operation usually involves trouble, skill and a degree of danger, as where the engine becomes stalled.

My invention provides means by which the main drive shaft, or its equivalent, may be positively held against reverse movement by means designed to form a normal interlocking engagement preventing reverse movement and capable of being automatically disengaged for free forward movement or of being positively disengaged in backing or reversing operations. Automatic disengagement for forward movement is effected by release of a locking pawl and action thereon by the locked element itself. Positive disengagement is effected by release of the pawl in the act of throwing the reversing gears into operation.

In the accompanying drawings showing one preferred embodiment of the invention:

Fig. 1 is a view in sectional elevation, on the line I—I of Fig. 2, showing the device in neutral interlocking position;

Fig. 2 is a plan view corresponding to Fig. 1;

Fig. 3 is a view corresponding to Fig. 1, showing the locking pawl positively withdrawn for reverse movement;

Fig. 4 is a detail plan view showing the reversing gear device shifted;

Fig. 5 is a detail sectional view on the line V—V of Fig. 1;

Fig. 6 is a detail plan view showing a modified construction of the pawl operating connection with the shift rod;

Fig. 7 is a section on the line VII—VII of Fig. 6.

Referring to the drawings, 2 is a supporting frame which may be the usual transmission casing of a motor-driven vehicle, or of any other mechanism to which the invention is applied.

The gear shift rods 3 and 4 or their equivalent are shown as slidably mounted in casing 2, operable by the usual gear shift lever for making the usual driving connections with the transmission gears, not shown, for low, second and high gear forward travel and for reverse movement. The device here involved is operatively related to the reverse rod 4 only.

In applying the invention to the main driving shaft 5, through which power of the engine is transmitted to the rear axle, in one direction for forward and in reverse direction for backward travel, I utilize a ratchet-wheel or member 6 having the series of shouldered teeth 7. A bracket 8 of U-shape or other suitable form is secured by bolts or otherwise to casing 2, providing a mounting for the locking pawl 9 and its operative parts.

The pawl 9 is freely pivoted by pin 10 at its rear end to a supporting and actuating lever 11 which in turn is secured to a cross shaft 12 journalled in the sides of bracket 8, as shown. The pawl 9 and lever 11 constitute outer and inner pivotally connected sections of a locking device and are movable into an operative position, wherein the pawl 9 or outer section may engage and disengage the teeth 7, or to an inoperative position to permit reverse movement of the wheel or member 6. The ends of pin 10 preferably extend through clearance slots 13 in the sides of the bracket 8 which thus limit its movement in either direction. Shaft 12 is provided with a crank arm 14 at one end having a wrist pin 15 by which the crank is connected to the thrust rod or pin 16.

Pin 16 is mounted for guiding movement in a lug or extension 17, preferably bent outwardly from one side of bracket 8, as in Fig. 2. The pin 16 is normally thrust outwardly towards stem 4 and lever 11 is normally retracted, as in Fig. 3, by a spring 18 of any suitable form. In the drawings, such spring is represented as a coiled wire, secured at one end in the bracket 8 and at the other end to shaft 12. It may, however, be of other suitable construction or may be applied to crank 14 or to stud 16, or in any manner capable of extending the stud and retracting the pawl.

Pawl 9 is provided with a lug or lugs 19 extending laterally over a lifting track face or faces 20 formed on the bracket 8, or otherwise, to guide the pawl away out of locking relation to the teeth 7. As shown, the face 20 is inclined divergently away from the annular pathway of the teeth, so that when the pawl is withdrawn as in Fig. 3, for backward travel of the vehicle, the ratchet-wheel 6 may freely rotate reversely with the shaft, as indicated by the arrow $a$.

In such position the reversing rod 4 is thrown from neutral, Fig. 2, to reversing position, Fig. 4, with the parts in non-locking position, Fig. 3.

For the purpose of positively retracting stud 16 to throw the pawl to normal operative position, rod 4 is provided with a cam extension 21 secured to the rod as shown or integral therewith as preferred.

Cam 21 has an inclined depressing face 22, and a straight holding face 23 parallel with rod 4, so that as the rod is shifted back from reversing position, Fig. 4, to neutral position, Fig. 2, face 22 will thrust the stem 16 backwardly and lower the lever arm 11 to thrust the pawl into locking position, as in Fig. 1.

In case it is desired, spring 18 may be dispensed with and the cam 21 may be made to operate positively in both directions, as in Figs. 6 and 7. In such construction the cam 21$a$ may be provided with a continuous inclined and straight cam groove 22$a$, 23$a$. The stem 16$a$ in such case is deflected at one or both sides in fork formation and is provided with a cross-pin 24 engaging the cam groove, so that positive movement will be imparted to it by the cam in either direction.

Automatic raising and lowering of the pawl 9 is effected by the wheel 6 in its action against a leaf spring 25.

Such spring, at one or both sides, is secured to the pawl and extends inwardly against the side face or faces of the ratchet-wheel, and is preferably provided with a bearing shoe or pad 26 of suitable material which frictionally engages the wheel. The spring is disposed eccentrically to the center of shaft 5 so that in reverse movement (see arrow $a$) the wiping action of the wheel tends to exert an inward pull on the pawl, thus continuously holding it inwardly in locking position.

On the other hand, when wheel 6 is rotating in the opposite direction, (see arrow $b$) for forward travel, the side wiping action against the spring or its shoe tends to throw the pawl outwardly and away from locking relation to the teeth. In either of such movements the pawl freely pivots on its hinge joint 10 and automatically assumes either locking or unlocking position in conformity with the direction of rotation of the main shaft 5.

Otherwise, under the only condition requiring unlocking of the pawl prior to positive backing, the throwing of the gears into reversing position by shifting of rod 4 effects outward thrust of the stem 16 with accompanying withdrawal of the pawl, as in Fig. 3. Upon again throwing the gears into neutral position the cam action lowers the pivotal mounting of the pawl and it resumes a forward position in immediate tooth engagement preventing the vehicle from moving rearwardly.

The car should first be brought to a dead stop after reversing and before shifting gears, when the pawl may then be lowered to locking position. Otherwise reverse rotation of the ratchet-wheel causes interference of the teeth against the pawl, preventing its proper placement.

The construction and operation of the invention will be readily understood and appreciated from the foregoing description. It may be changed or modified by the skilled mechanic to adapt it to reverse movement prevention in connection with my other mechanism than in the particular field of motor car construction, as with elevator, inclined plane, haulage, or other various operations where it is desirable to provide against undesired reverse movement.

The detail construction, size, design, or other features are subject to the conditions present, but all such changes are to be understood as within the scope of the following claims.

What I claim is:—

1. In combination with a ratchet-wheel, a locking pawl therefor, a shifting lever having pivotal connection with the pawl, means for actuating the lever, and an arm on the pawl frictionally engaging the ratchet wheel.

2. In combination with a ratchet-wheel, a locking pawl therefor, a shifting lever having pivotal connection with the pawl, a crank therefor, cam mechanism for actuating the crank, and a friction arm on the pawl engaging the ratchet wheel.

3. In combination with a ratchet-wheel, a locking pawl therefor, a shifting lever having pivotal connection with the pawl, a crank therefor, cam mechanism for actuating the crank, and a spring adapted to exert pressure towards the cam.

4. In combination with the drive shaft of an automobile having a ratchet-wheel thereon and a reversing rod, a supporting bracket provided with a lever arm, a locking pawl pivoted on the lever arm, a cam on the reversing rod, and a connection between the cam and the lever arm.

5. In combination with the drive shaft of an automobile having a ratchet-wheel thereon and a reversing rod, a supporting bracket provided with a pawl receding trackway and a lever arm, a locking pawl pivoted on the lever arm and resting on said trackway, a cam on the reversing rod, and a connection between the cam and the lever arm.

6. In combination with a shaft holding and releasing ratchet-wheel, a locking pawl having a friction arm engaging the ratchet-wheel, a lever arm having pivotal connection with the pawl, means for operating the lever arm, and a mounting support for the lever arm provided with a lifting trackway for the pawl.

7. In combination with a shaft holding and releasing ratchet-wheel and a gear shifting reversing rod, a locking pawl, a movable pivoting mounting for the pawl, means for actuating said mounting by the reversing rod, and means for exerting lifting or seating action on the pawl by the ratchet-wheel.

8. In combination with a shaft holding and releasing ratchet-wheel and a gear shifting reversing rod, a locking pawl, a movable pivoting mounting for the pawl, means for actuating said mounting by the reversing rod, and a resilient arm secured to the pawl and having frictional bearing engagement against the side of the ratchet-wheel.

9. In combination with a shaft holding and releasing ratchet-wheel, a locking pawl having a friction arm engaging the ratchet-wheel, a lever arm having pivotal connection with the pawl, a crank for the lever arm, a stem therefor, a gear shifting reversing rod, and a cam on said rod engaging the crank stem.

10. In combination with a shaft holding and releasing ratchet-wheel, a locking pawl having a friction arm engaging the ratchet-wheel, a lever arm having pivotal connection with the pawl, a crank for the lever arm, a stem therefor, a gear shifting reversing rod, a cam on said rod engaging the crank stem, and a spring adapted to thrust the crank stem towards the cam.

11. Means for preventing reverse movement of a shaft or the like consisting of a ratchet-wheel, a pawl having a swinging pivotal mounting, means for changing position of the pivotal mounting to locate the pawl in operative or inoperative relation to the teeth of the ratchet-wheel, and means for independently moving the pawl on its pivotal mounting.

12. Means for preventing reverse movement of a shaft or the like consisting of a ratchet-wheel, a pawl having a swinging pivotal mounting, means for changing position of the pivotal mounting to locate the pawl in operative or inoperative relation to the teeth of the ratchet-wheel, and a resilient arm secured to the pawl and having a friction shoe in bearing engagemnt against the side of the ratchet-wheel.

13. Means for preventing reverse movement of a shaft consisting of a ratchet wheel, a multiple movement pawl therefor, means for actuating the pawl, and a gear shifting reversing rod operatively connected with said pawl actuating means.

14. In combination with a driving shaft, a ratchet wheel thereon, a locking pawl for the ratchet wheel having a movable pivotal mounting, means for varying the position of the pivotal mounting, and a radially movable wiping friction member on the pawl engaging the ratchet wheel and causing the pawl to engage or disengage a tooth of the ratchet wheel dependent on the direction of rotation of the shaft.

15. In combination with a driving shaft, a ratchet wheel thereon, a locking pawl for the ratchet wheel having a movable pivotal mounting, means for varying the position of the pivotal mounting, a radially movable wiping friction member on the pawl engaging the ratchet wheel and causing the pawl to engage or disengage a tooth of the ratchet wheel dependent on the direction of rotation of the shaft, and a gear shift rod in operative engagement with the means for varying the pivotal mounting of the pawl.

16. In combination with a driving shaft having a ratchet wheel thereon, a locking pawl for the ratchet wheel having a movable pivot, means for actuating the pawl and its pivot, and a spring arm extending from the pawl and frictionally engaging the side of the ratchet wheel at varying distances from its center dependent on direction of rotation of the ratchet wheel.

17. In apparatus of the class described, the combination with a shaft adapted to be connected in driving relation to certain of the wheels of a vehicle, of a member connected to and rotated by said shaft in either direction according to the direction of movement of the vehicle and provided with ratchet teeth, a pawl comprising pivotally connected sections, the outer section being arranged to engage or disengage said teeth, and a device connected to said outer pawl section and controlled by said member for operating said outer pawl section according to the direction of movement of said member.

18. In apparatus of the class described, the combination with a shaft adapted to be connected in driving relation to certain of the wheels of a vehicle, of a member connected to and rotated by said shaft in either direction according to the direction of movement of the vehicle and having a series of ratchet teeth, a pawl comprising pivotally connected sections, the outer section being arranged to engage and disengage said teeth, and a device connected to said outer pawl section and having engagement with said member and operated by the latter according to its direction of movement, whereby said outer pawl section is operated to engage or disengage said member.

19. In apparatus of the class described, the combination with a shaft adapted to be connected in driving relation to certain of the wheels of a vehicle, of a member connected to and rotated by said shaft in either direction according to the direction of movement of the vehicle and provided with a series of ratchet teeth, a pawl comprising a pair of pivotally connected sections, the outer section being arranged to engage and disengage said teeth, and a device carried by the outer pawl section and controlled by said member for operating said pawl section according to the direction of movement of said member, and means arranged to engage said inner pawl section and act therethrough to retract said outer pawl section relative to said teeth into an inactive position.

20. In a vehicle construction having a transmission mechanism, the combination with a shifting element for such mechanism, of a member adapted to be connected to and rotated by an element driven by said mechanism in either direction and having a series of ratchet teeth, a pawl comprising pivotally connected sections, the outer section being disposed in active position relative to said member in one predetermined position of said shifting element and arranged to engage and disengage said teeth, a device connected to said outer pawl section and engaging with and controlled by said member for moving said outer pawl section into engagement with said teeth or disengaging it therefrom according to the direction of movement of said member, and an operating connection between said shifting element and said inner pawl section arranged to retract said outer pawl section relative to said teeth and move it into an inactive position when said element is moved to "reverse".

21. In apparatus of the class described, the combination with the shaft of a self-propelled vehicle, a change speed and reverse mechanism for said shaft and shift means for said mechanism, of a member connected to and rotated by said shaft in either direction according to the direction of movement of the vehicle and having a series of ratchet teeth, and means for locking and releasing said member, and means comprising a pawl having pivotally connected sections the outer one of which is arranged to engage and disengage said teeth and a device carried by one of the pawl sections and engaging said member and operated thereby in opposite directions from one position to another according to its direction of movement, and an operating connection between said shift means and said inner pawl section arranged to move the latter into inactive position when said shift means are moved to "reverse" position.

22. In apparatus of the class described, the combination with the shaft of a self-propelled vehicle having a change speed and reverse mechanism for said shaft and shift means for such mechanism, of a member connected to and rotated by said shaft in either direction according to the direction of movement thereof and having a series of ratchet teeth, means for locking and releasing said member, said means comprising a pawl having pivotally connected sections the outer one of which is arranged to engage and disengage said teeth and a device carried by one of said pawl sections and engaging said member and operated thereby in opposite directions from one position to another according to the direction of movement of said member, and an operating connection between said shift means and said inner pawl section arranged to move the latter into inactive position when said shift means are moved to "reverse" position, or into position to engage said member when said shift means are moved to "low" position.

23. In a vehicle construction having a change speed and reverse mechanism, the combination with a shaft adapted to be connected in driving relation with the vehicle wheels and shift means for the mechanism, of a member fixed to and rotated by said shaft, a device comprising pivotally connected sections the outer one of which is arranged to engage said member to lock it against movement in one direction and to disengage said member to permit its movement in the opposite direction, means between said device and said member for controlling the engagement with and disengagement of said device from said member according to its direction of movement, said outer section of said device being movable to an inactive position, and operating connections between said inner section of said device and said shaft means for moving said outer section into an inactive position when said shifting means if moved to reverse driving position and for moving said outer section into active position to engage said member when said shifting means is moved into one of the forward driving positions.

24. In apparatus of the class described, the combination with a shaft adapted to be connected in driving relation to the wheels of a vehicle, of means to prevent rotation of said shaft in the direction of movement of the vehicle rearwardly, said means consisting of a member fixed to and rotated by said shaft and provided with an annular rack and a pawl, said pawl comprising an inner member pivotally mounted at its inner end and an outer member pivotally connected to the outer end of said inner member and movable independently thereof to engage and disengage said rack, and a device carried by one of said pawl members and frictionally engaging said rotated member, whereby the latter will act through said device to move the outer pawl member into or out of engagement with said rack according to its direction of movement.

25. In apparatus of the class described, the combination with a shaft adapted to be connected in driving relation to the wheels of a vehicle, of means to prevent rotation of said shaft in the direction of movement of the vehicle rearwardly, said means consisting of a member fixed to and rotated by said shaft and provided with an annular rack and a pawl, said pawl comprising an inner pivoted member and an outer member pivotally connected to said inner member and arranged to engage and disengage said rack, a device carried by said outer pawl member and frictionally engaging said rotated member, whereby the latter will act through said device to move said outer member into or out of engagement with said rack, and means for swinging said inner member about its pivot to move said outer member into an inactive position or into operative relation to said member.

26. In apparatus of the class described, the combination with a shaft adapted to be connected in driving relation to the wheels of a vehicle, of means to prevent rotation of said shaft in the direction of movement of the vehicle rearwardly, said means consisting of a member fixed to said shaft and provided with an annular rack and a pawl, said pawl comprising an inner pivoted member and an outer member pivotally connected to said inner member and arranged to engage and disengage said rack, a device carried by said outer pawl member and frictionally engaging said member, whereby said member will act through said device to move said outer member into or out of engagement with said rack, means for swinging said inner member about its pivot to move said outer member into an inactive position or into operative relation to the member fixed to said shaft, and means for limiting the movement of said inner member in either direction.

27. In a vehicle construction, the combination with a shaft adapted to be connected in driving relation to certain of the vehicle wheels, of a member connected to and rotated by said shaft and provided with a series of teeth, a device pivoted on a portion of the vehicle and having a pair of elements one of which is arranged to engage and disengage said teeth and the other of which engages a portion of said member and is actuated thereby according to its direction of movement to swing said device about its pivot, whereby the first mentioned element engages or disengages said teeth, and means on an adjacent portion of the vehicle for guiding said first mentioned element.

28. In a vehicle construction, the combination with a shaft adapted to be connected in driving relation to certain of the vehicle wheels and a shift element, of a member connected to and rotated by said shaft according to the direction of movement of the vehicle and provided with a series of ratchet teeth, a pivoted device comprising a pair of pivotally connected elements and an operating element carried by the outer element, and connections between said shift element and said device for moving the latter into and out of operative position, said outer element being operable by said operating element independently of the inner element of said device only when the latter is in operative position.

29. In mechanism of the class described, the combination with a shaft connected in driving relation with certain of the wheels of a vehicle, of a member connected to and rotated by said shaft in either direction and having a series of ratchet teeth, a pawl comprising a pair of pivotally connected sections, and outer section being arranged to engage and disengage said teeth, and a device carried by said outer pawl section and having contact with said member, whereby the latter actuates said outer pawl section, and means for guiding the free end of said outer pawl section into engagement with said teeth at an angle to the plane of said member.

In testimony whereof I hereunto affix my signature.

SIDNEY C. PORTER.